(12) United States Patent
Hart et al.

(10) Patent No.: US 8,634,343 B2
(45) Date of Patent: Jan. 21, 2014

(54) COMMUNICATION SYSTEM WITH IMPROVED QOS FOR MULTIHOP RELAY INK

(75) Inventors: Michael John Beems Hart, London (GB); Yuefeng Zhou, Haywards Heath (GB)

(73) Assignee: Fujitsu Limited, Kawasaki-shi (JP)

( * ) Notice: Subject to any disclaimer, the term of this patent is extended or adjusted under 35 U.S.C. 154(b) by 950 days.

(21) Appl. No.: 11/856,178

(22) Filed: Sep. 17, 2007

(65) Prior Publication Data

US 2008/0107073 A1    May 8, 2008

(30) Foreign Application Priority Data

Nov. 6, 2006    (GB) .................................. 0622122.0

(51) Int. Cl.
*H04W 4/00*    (2009.01)

(52) U.S. Cl.
USPC ............................ 370/328; 370/330; 370/336

(58) Field of Classification Search
USPC ......................................... 370/329, 338, 343
See application file for complete search history.

(56) References Cited

U.S. PATENT DOCUMENTS

| | | | |
|---|---|---|---|
| 5,719,868 A | 2/1998 | Young | |
| 6,370,384 B1 | 4/2002 | Komara | |
| 6,701,129 B1 | 3/2004 | Hashem et al. | |
| 7,069,009 B2 * | 6/2006 | Li et al. | 455/446 |
| 7,096,274 B1 | 8/2006 | Ci et al. | |
| 7,184,703 B1 * | 2/2007 | Naden et al. | 455/10 |
| 7,630,355 B2 * | 12/2009 | Tao et al. | 370/343 |
| 7,742,448 B2 * | 6/2010 | Ramachandran et al. | 370/329 |
| 7,796,547 B2 * | 9/2010 | Etemad et al. | 370/328 |
| 7,873,002 B2 * | 1/2011 | Cai | 370/329 |
| 7,877,057 B2 * | 1/2011 | Izumikawa et al. | 455/7 |
| 7,990,905 B2 | 8/2011 | Lappeteläinen et al. | 370/315 |
| 8,032,146 B2 * | 10/2011 | Zhu et al. | 455/450 |

(Continued)

FOREIGN PATENT DOCUMENTS

| | | |
|---|---|---|
| CN | 1237841 | 1/2006 |
| EP | 0 151 280 | 12/1984 |

(Continued)

OTHER PUBLICATIONS

Communication from the European Patent Office, European Search Report for Application No. EP 07 11 3538, Dec. 27, 2007, 7 pages.

(Continued)

*Primary Examiner* — Brian O'Connor
(74) *Attorney, Agent, or Firm* — Baker Botts L.L.P.

(57) ABSTRACT

A transmission method for use in a multi-hop wireless communication system is provided. The system uses a time-frequency format in assigning available transmission frequency bandwidth during a discrete transmission interval. The format defines transmission windows within an interval, each window occupying a part of that interval and having a frequency bandwidth profile, each said window being assignable for a transmission interval. The transmission windows include an initial control window for control information transmission and a relay window for transmission by a source apparatus to an intermediate apparatus. The relay window is defined as the last window in the discrete transmission interval assignable to the source apparatus for transmission. The method includes employing the format to assign the control window to a source apparatus and to an intermediate apparatus for control information transmission and to assign the relay window to the source apparatus for data transmission to the intermediate apparatus.

31 Claims, 10 Drawing Sheets

(56) References Cited

U.S. PATENT DOCUMENTS

| | | | |
|---|---|---|---|
| 8,095,160 B2* | 1/2012 | Hamasaki et al. | 455/502 |
| 8,199,690 B2* | 6/2012 | Tsai et al. | 370/315 |
| 2002/0080816 A1 | 6/2002 | Spinar et al. | |
| 2003/0054771 A1 | 3/2003 | Chappaz | |
| 2003/0125067 A1 | 7/2003 | Takeda et al. | |
| 2004/0005861 A1 | 1/2004 | Tauchi | |
| 2004/0100929 A1 | 5/2004 | Garcia-Luna-Aceves | |
| 2004/0109428 A1 | 6/2004 | Krishnamurthy | |
| 2005/0030887 A1 | 2/2005 | Jacobsen et al. | |
| 2005/0048914 A1 | 3/2005 | Sartori et al. | |
| 2006/0023745 A1 | 2/2006 | Koo et al. | |
| 2006/0029011 A1* | 2/2006 | Etemad et al. | 370/311 |
| 2006/0046643 A1* | 3/2006 | Izumikawa et al. | 455/7 |
| 2006/0193280 A1* | 8/2006 | Lee et al. | 370/315 |
| 2006/0256741 A1 | 11/2006 | Nozaki | |
| 2006/0264172 A1 | 11/2006 | Izumikawa et al. | |
| 2008/0070582 A1* | 3/2008 | Cai | 455/450 |

FOREIGN PATENT DOCUMENTS

| | | | |
|---|---|---|---|
| EP | 0963086 | 1/1999 | |
| EP | 1 617 693 | 1/2006 | |
| EP | 1 635 592 | 3/2006 | |
| EP | 1 677 443 | 7/2006 | |
| EP | 1 804 430 A1 | 7/2007 | |
| KR | 20060096510 | 9/2006 | H04B 7/26 |
| WO | WO 99/44341 | 9/1999 | |
| WO | WO 01/76289 | 10/2001 | |
| WO | WO 03/058984 | 7/2003 | |
| WO | WO 2004/056013 | 7/2004 | |
| WO | WO 2004/107693 | 12/2004 | |
| WO | WO 2005/067173 | 7/2005 | |
| WO | WO 2006/012554 | 2/2006 | |
| WO | WO 2006/065069 | 6/2006 | |
| WO | WO 2006/098608 | 9/2006 | |
| WO | WO 2006/120161 | 11/2006 | |

OTHER PUBLICATIONS

Communication from the European Patent Office, European Search Report for Application No. EP 07113557.8-1525, Dec. 3, 2007, 7 pages.

The Patent Office, Search Report under Section 17, U.K. Application No. GB0616482, date of search Oct. 27, 2006, 1 page.

The Patent Office, Search Report under Section 17, U.K. Application No. GB0616471, date of search Oct. 27, 2006, 1 page.

The Patent Office, Search Report under Section 17, U.K. Application No. GB0616477, date of search Oct. 27, 2006, 1 page.

The Patent Office, Search Report under Section 17, U.K. Application No. GB0616472, date of search Nov. 3, 2006, 1 page.

The Patent Office, Search Report under Section 17, U.K. Application No. 0616479, date of search Oct. 27, 2006, 1 page.

The Patent Office, Search Report under Section 17, U.K. Application No. 0622124, date of search Dec. 7, 2006, 1 page.

The Patent Office, Search Report under Section 17, U.K. Application No. 0622122, date of search Nov. 28, 2006, 1 page.

IEEE Computer Society, "IEEE Standards for Information Technology, 803.11g™," Part 11: Wireless LAN Medium Access Control (MAC) and Physical Layer (PHY) Specifications, Amendment 4: Further Higher Data Rate Extension in the 2.4 GHz Band, Jun. 27, 2003, 78 pages.

Hart et al., "Relay Midamble," IEEE 802.16 Broadband Wireless Access Working Group < http://ieee802.org/16>, pp. 0-3 , Nov. 6, 2006.

Hart et al., "Frame Structure for Multihop Relaying Support," IEEE 802.16 Broadband Wireless Access Working Group < http://ieee802.org/16>, IEE C80216j/138, ieee 802.16 meeting #46, pp. 0-9 , Nov. 2006.

Hart et al., >, "TDD MR Frame Structure," IEEE 802.16 Broadband Wireless Access Working Group < http://ieee802.org/16>, pp. 1-10, Oct. 20, 2006.

Hart, "Dimensioning and System Level Analysis of an HSDPA Network with Relaying Nodes," 5 pages, 2005.

Chu, "Polyphase Codes with Good Periodic Correlation Properties," IEEE Transactions on Information Theory, Jul. 1972, pp. 531-532.

Frank et al., "Phase Shift Pulse Codes with Good Periodic Correlation Properties," IRE Transactions on Information Theory, pp. 381-382, Oct. 1962.

Milewski, "Periodic Sequences with Optimal Properties for Channel Estimation and Fast Start-Up Equalization," IBM Research and Development Journal, pp. 426-431, Sep. 1983.

Hart, "Optimal Transmit Power Balancing in Multi-Hop Networks," Fujitsu Laboratories of Europe, Ltd., 6 pages, 2005.

Golay, "Multi-Slit Spectrometry," Journal of the Optical Society of America, vol. 39, No. 6, pp. 437-444, Jun. 1949.

Golay, "Complementary Series," IRE Transactions on Information Theory, IT 7, pp. 82-87, Apr. 1961.

Zhou et al., "Communication Systems," Pending U.S. Appl. No. 11/840,492, filed Aug. 17, 2007.

Zhou et al., "Communication Systems," Pending U.S. Appl. No. 11/840,518, filed Aug. 17, 2007.

Hart et al., "Communication Systems," Pending U.S. Appl. No. 11/840,546, filed Aug. 17, 2007.

Hart et al., "Communication Systems," Pending U.S. Appl. No. 11/840,570, filed Aug. 17, 2007.

Zhou et al., "Communication Systems," Pending U.S. Appl. No. 11/840,595, filed Aug. 17, 2007.

Hart et al., "Communication Systems," Pending U.S. Appl. No. 11/840,621, filed Aug. 17, 2007.

Hart et al., "Communication Systems," Pending U.S. Appl. No. 11/840,644, filed Aug. 17, 2007.

Hart et al., "Communication Systems," Pending U.S. Appl. No. 11/840,669, filed Aug. 17, 2007.

Hart et al., "Communication Systems," Pending U.S. Appl. No. 11/840,429, filed Sep. 7, 2007.

Hart et al., "Communication Systems," Pending U.S. Appl. No. 11/840,430, filed Sep. 7, 2007.

Hart et al., "Wireless Communication Systems," Pending U.S. Appl. No. 11/856,139, filed Sep. 17, 2007.

Hart et al., "Wireless Communication Systems," Pending U.S. Appl. No. 11/856,145, filed Sep. 17, 2007.

Hart et al., "Communication Systems," Pending U.S. Appl. No. 11/856,178, filed Sep. 17, 2007.

European Patent Office, European Search Report for Application No. EP 08 15 5435, Aug. 1, 2008, 8 pages.

European Patent Office, European Search Report for Application No. EP 07 11 3483, Sep. 26, 2007, 6 pages.

IEEE Computer Society, IEEE Standard for Local and Metropolitan Area Networks, Part 16: Air Interface for Fixed Broadband Wireless Access Systems—Amendment 2: Medium Access Control Modifications and Additional Physical Layer Specifications for 2-11 GHz, Apr. 1, 2003, p. 1, 19, 68-70, and 80-87.

Hart et al., "Factors That Affect Performance of a Mobile Multihop Relay System," IEEE 802.16 Presentation Submission Template (Rev.8.3), Sep. 13, 2005, 19 pages.

Relay Task Group of IEEE 802.16, "Part 16: Air Interface for Fixed and Mobile Broadband Wireless Access Systems," Multihop Relay Specification, p. 1-12 and 78-104, Jun. 6, 2007.

Japanese Office Action with English Translation; Application No. 2007-284145; pp. 7, Jan. 17, 2012.

Gang Shen et al., "Recommendations on IEEE 802.16j", IEEE C802.16; pp. 7, May 2006.

Zhang et al.; "Some Considerations on Mobile Multi-hop Relay System"; IEEE 802.16; pp. 11, 2006.

Communication from the European Patent Office, European Search Report for Application No. EP 08 15 8421, Oct. 21, 2008, 1 pages.

Communication from the European Patent Office, European Search Report for Application No. EP 07 11 3481, Oct. 19, 2007, 1 pages, Oct. 21, 2008.

Kaneko et al., "Proposed Relay Method with P-MP Structure of IEEE802.16-2004," 2005 IEEE 16th International Symposium on Personal, Indoor and Mobile Radio Communications, pp. 1606-1610, Sep. 11, 2005 through Sep. 14, 2005.

(56) References Cited

OTHER PUBLICATIONS

Hoymann et al., "Multihop Communication in Relay Enhanced IEEE 802.16 Networks," The 17th Annual IEEE International Symposium on Personal, Indoor and Mobile Radio Communications, 5 pages, Sep. 1, 2006.

Etri et al, Transmission of IP Packets over Ethernet over IEEE 802.16, draft-riegel-16ng-ip-over-eth-over-80216-01.txt, Oct. 1, 2006, pp. 1-16.

Kim et al., Fair and Efficient Multihop Scheduling Algorithm for IEEE 802.16 BWA Systems, pp. 895-901, Oct. 3-7, 2005.

KIPO's Notice of Preliminary Rejection, with English translation; pp. 7, Oct. 28, 2011.

Extended European Search Report; Application No. 09171903.9; pp. 6, Apr. 2, 2012.

Hart et al.; "Relay midamble"; IEEE 802.16 Braodband Wireless Access Working Group; http://ieee802.org/16; pp. 3, Nov. 7, 2006.

Asa et al.; "Relay Strategy of Broadcast Messages in Mobile Multihop Relay"; IEEE 802.16 Presentation Submission Template (Rev. 8.3); Venue: IEEE 802.16 Session #41, New Delhi, India; pp. 14, Jan. 6, 2006.

Extended European Search Report; Application No. 07113549.5; pp. 6, May 4, 2013.

Chinese Office Action and English translation; Application No. 201110140429.7; pp. 19, May 14, 2013.

Leng et al. ; "A frame structure for mobile multi-hop relay with different carrier frequencies"; IEEE 802.16 Session # 40; pp. 8, Nov. 11, 2005.

\* cited by examiner

Frame Structure

More than three hop frame structure (with interval subdivision)

Detailed frame structure for three-hop

Beyond two-hop frame structure (extra transition)

Relay link interval

RP position determination algorithm

RP Position Determination Algorithm

Example TDD frame structure from OFDMA physical layer of the IEEE802.16 standard

US 8,634,343 B2

COMMUNICATION SYSTEM WITH IMPROVED QOS FOR MULTIHOP RELAY INK

RELATED APPLICATION

This application claims foreign priority benefits under 35 U.S.C. §119 of United Kingdom Application No. GB 0622122.0, filed on Nov. 6, 2006, entitled "Communication Systems".

CROSS-REFERENCE TO RELATED APPLICATIONS

This application relates to the following applications, each of which is incorporated herein by reference:
COMMUNICATION SYSTEMS, application Ser. No. 11/840,546, filed Aug. 17, 2007 and currently pending;
COMMUNICATION SYSTEMS, application Ser. No. 11/840,570, filed Aug. 17, 2007 and currently pending;
COMMUNICATION SYSTEMS, application Ser. No. 11/840,621, filed Aug. 17, 2007 and currently pending;
COMMUNICATION SYSTEMS, application Ser. No. 11/840,644, filed Aug. 17, 2007 and currently pending;
COMMUNICATION SYSTEMS, application Ser. No. 11/840,669, filed Aug. 17, 2007 and currently pending; and
COMMUNICATION SYSTEMS, United Kingdom Application No. GB 0622120.4, filed on Nov. 6, 2006.

TECHNICAL FIELD

This invention relates in general to communication systems, and more particularly to a frame structure for a communication system.

OVERVIEW

Currently there exists interest in the use of multihop techniques in packet based radio and other communication systems, where it is purported that such techniques will enable both extension in coverage range and increase in system capacity (throughput).

In a multi-hop communication system, communication signals are sent in a communication direction along a communication path (C) from a source apparatus to a destination apparatus via one or more intermediate apparatuses. FIG. 6 illustrates a single-cell two-hop wireless communication system comprising a base station BS (known in the context of 3 G communication systems as "node-B" NB) a relay node RN (also known as a relay station RS) and a user equipment UE (also known as mobile station MS). In the case where signals are being transmitted on the downlink (DL) from a base station to a destination user equipment (UE) via the relay node (RN), the base station comprises the source station (S) and the user equipment comprises the destination station (D). In the case where communication signals are being transmitted on the uplink (UL) from a user equipment (UE), via the relay node, to the base station, the user equipment comprises the source station and the base station comprises the destination station. The relay node is an example of an intermediate apparatus (I) and comprises: a receiver, operable to receive data from the source apparatus; and a transmitter, operable to transmit this data, or a derivative thereof, to the destination apparatus.

Simple analogue repeaters or digital repeaters have been used as relays to improve or provide coverage in dead spots. They can either operate in a different transmission frequency band from the source station to prevent interference between the source transmission and the repeater transmission, or they can operate at a time when there is no transmission from the source station.

FIG. 7 illustrates a number of applications for relay stations. For fixed infrastructure, the coverage provided by a relay station may be "in-fill" to allow access to the communication network for mobile stations which may otherwise be in the shadow of other objects or otherwise unable to receive a signal of sufficient strength from the base station despite being within the normal range of the base station. "Range extension" is also shown, in which a relay station allows access when a mobile station is outside the normal data transmission range of a base station. One example of in-fill shown at the top right of FIG. 7 is positioning of a nomadic relay station to allow penetration of coverage within a building that could be above, at, or below ground level.

Other applications are nomadic relay stations which are brought into effect for temporary cover, providing access during events or emergencies/disasters. A final application shown in the bottom right of FIG. 7 provides access to a network using a relay positioned on a vehicle.

Relays may also be used in conjunction with advanced transmission techniques to enhance gain of the communications system as explained below.

It is known that the occurrence of propagation loss, or "pathloss", due to the scattering or absorption of a radio communication as it travels through space, causes the strength of a signal to diminish. Factors which influence the pathloss between a transmitter and a receiver include: transmitter antenna height, receiver antenna height, carrier frequency, clutter type (urban, sub-urban, rural), details of morphology such as height, density, separation, terrain type (hilly, flat). The pathloss L (dB) between a transmitter and a receiver can be modelled by:

$$L = b + 10n \log d \tag{A}$$

Where d (meters) is the transmitter-receiver separation, b(db) and n are the pathloss parameters and the absolute pathloss is given by $l = 10^{(L/10)}$.

The sum of the absolute path losses experienced over the indirect link SI+ID may be less than the pathloss experienced over the direct link SD. In other words it is possible for:

$$L(SI) + L(ID) < L(SD) \tag{B}$$

Splitting a single transmission link into two shorter transmission segments therefore exploits the non-linear relationship between pathloss verses distance. From a simple theoretical analysis of the pathloss using equation (A), it can be appreciated that a reduction in the overall pathloss (and therefore an improvement, or gain, in signal strength and thus data throughput) can be achieved if a signal is sent from a source apparatus to a destination apparatus via an intermediate apparatus (e.g. relay node), rather than being sent directly from the source apparatus to the destination apparatus. If implemented appropriately, multi-hop communication systems can allow for a reduction in the transmit power of transmitters which facilitate wireless transmissions, leading to a reduction in interference levels as well as decreasing exposure to electromagnetic emissions. Alternatively, the reduction in overall pathloss can be exploited to improve the received signal quality at the receiver without an increase in the overall radiated transmission power required to convey the signal.

Multi-hop systems are suitable for use with multi-carrier transmission. In a multi-carrier transmission system, such as FDM (frequency division multiplex), OFDM (orthogonal frequency division multiplex) or DMT (discrete multi-tone), a single data stream is modulated onto N parallel sub-carriers, each sub-carrier signal having its own frequency range. This allows the total bandwidth (i.e. the amount of data to be sent in a given time interval) to be divided over a plurality of sub-carriers thereby increasing the duration of each data symbol. Since each sub-carrier has a lower information rate, multi-carrier systems benefit from enhanced immunity to channel induced distortion compared with single carrier systems. This is made possible by ensuring that the transmission rate and hence bandwidth of each subcarrier is less than the coherence bandwidth of the channel. As a result, the channel distortion experienced on a signal subcarrier is frequency independent and can hence be corrected by a simple phase and amplitude correction factor. Thus the channel distortion correction entity within a multicarrier receiver can be of significantly lower complexity of its counterpart within a single carrier receiver when the system bandwidth is in excess of the coherence bandwidth of the channel.

Orthogonal frequency division multiplexing (OFDM) is a modulation technique that is based on FDM. An OFDM system uses a plurality of sub-carrier frequencies which are orthogonal in a mathematical sense so that the sub-carriers' spectra may overlap without interference due to the fact they are mutually independent. The orthogonality of OFDM systems removes the need for guard band frequencies and thereby increases the spectral efficiency of the system. OFDM has been proposed and adopted for many wireless systems. It is currently used in Asymmetric Digital Subscriber Line (ADSL) connections, in some wireless LAN applications (such as WiFi devices based on the IEEE802.11a/g standard), and in wireless MAN applications such as WiMAX (based on the IEEE 802.16 standard). OFDM is often used in conjunction with channel coding, an error correction technique, to create coded orthogonal FDM or COFDM. COFDM is now widely used in digital telecommunications systems to improve the performance of an OFDM based system in a multipath environment where variations in the channel distortion can be seen across both sub-carriers in the frequency domain and symbols in the time domain. The system has found use in video and audio broadcasting, such as DVB and DAB, as well as certain types of computer networking technology.

In an OFDM system, a block of N modulated parallel data source signals is mapped to N orthogonal parallel sub-carriers by using an Inverse Discrete or Fast Fourier Transform algorithm (IDFT/IFFT) to form a signal known as an "OFDM symbol" in the time domain at the transmitter. Thus, an "OFDM symbol" is the composite signal of all N sub-carrier signals. An OFDM symbol can be represented mathematically as:

$$x(t) = \frac{1}{\sqrt{N}} \sum_{n=0}^{N-1} c_n \cdot e^{j2\pi n \Delta f t}, \ 0 \leq t \leq T_s \quad (1)$$

where $\Delta f$ is the sub-carrier separation in Hz, $Ts=1/\Delta f$ is symbol time interval in seconds, and $c_n$ are the modulated source signals. The sub-carrier vector in (1) onto which each of the source signals is modulated $c \in C_n$, $c=(c_0, c_1 \ldots c_{N-1})$ is a vector of N constellation symbols from a finite constellation. At the receiver, the received time-domain signal is transformed back to frequency domain by applying Discrete Fourier Transform (DFT) or Fast Fourier Transform (FFT) algorithm.

OFDMA (Orthogonal Frequency Division Multiple Access) is a multiple access variant of OFDM. It works by assigning a subset of sub-carriers, to an individual user. This allows simultaneous transmission from several users leading to better spectral efficiency. However, there is still the issue of allowing bi-directional communication, that is, in the uplink and download directions, without interference.

In order to enable bi-directional communication between two nodes, two well known different approaches exist for duplexing the two (forward or download and reverse or uplink) communication links to overcome the physical limitation that a device cannot simultaneously transmit and receive on the same resource medium. The first, frequency division duplexing (FDD), involves operating the two links simultaneously but on different frequency bands by subdividing the transmission medium into two distinct bands, one for forward link and the other for reverse link communications. The second, time division duplexing (TDD), involves operating the two links on the same frequency band, but subdividing the access to the medium in time so that only the forward or the reverse link will be utilizing the medium at any one point in time. Both approaches (TDD & FDD) have their relative merits and are both well used techniques for single hop wired and wireless communication systems. For example the IEEE 802.16 standard incorporates both an FDD and TDD mode.

As an example, FIG. 8 illustrates the single hop TDD frame structure used in the OFDMA physical layer mode of the IEEE 802.16 standard (WiMAX). Each frame is divided into DL and UL subframes, each being a discrete transmission interval. They are separated by Transmit/Receive and Receive/Transmit Transition Guard interval (TTG and RTG respectively). Each DL subframe starts with a preamble followed by the Frame Control Header (FCH), the DL-MAP, and the UL-MAP. The FCH contains the DL Frame Prefix (DLFP) to specify the burst profile and the length of the DL-MAP. The DLFP is a data structure transmitted at the beginning of each frame and contains information regarding the current frame; it is mapped to the FCH.

Simultaneous DL allocations can be broadcast, multicast and unicast and they can also include an allocation for another BS rather than a serving BS. Simultaneous ULs can be data allocations and ranging or bandwidth requests.

SUMMARY OF EXAMPLE EMBODIMENTS

A transmission method for use in a multi-hop wireless communication system is provided. The system includes a source apparatus, a destination apparatus and one or more intermediate apparatuses. The source apparatus is operable to transmit along a series of links forming a communication path extending from the source apparatus to the destination apparatus via the intermediate apparatus. Each intermediate apparatus is operable to receive from a previous apparatus along the path and to transmit to a subsequent apparatus along the path. The system has access to a time-frequency format for use in assigning available transmission frequency bandwidth during a discrete transmission interval, said format defining a plurality of transmission windows within such an interval, each window occupying a part of that interval and having a frequency bandwidth profile within said available transmission frequency bandwidth over its part of that interval, each said window being assignable for such a transmission interval to one or more of said apparatuses for use in transmission. The transmission windows include an initial control window for control information transmission and a relay window for transmission by the source apparatus to at least one of said intermediate apparatuses. The relay window is defined as the last window in the discrete transmission interval assignable to the source apparatus for transmission. The method includes employing said format for such a transmission interval to assign the control window to the source apparatus and to the intermediate apparatus for control information transmission and to assign the relay window to the source apparatus for data transmission to a particular one of said intermediate apparatuses. In this way, at least one window between the preamble window and the relay window can be assigned to the particular intermediate apparatus for data transmission. The method also includes transmitting in the transmission interval.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

In order to enable bi-directional communication between two nodes, two well known different approaches exist for duplexing the two (forward and reverse) communication links to overcome the physical limitation that a device cannot simultaneously transmit and receive on the same resource medium. The first, frequency division duplexing, involves operating the two links simultaneously but on different frequency bands by subdividing the transmission medium into two distinct bands, one for forward link and the other for reverse link communications. The second, time division duplexing, involves operating the two links on the same frequency band, but subdividing the access to the medium in time so that only the forward or the reverse link will be utilizing the medium at any one point in time.

Figure 8:
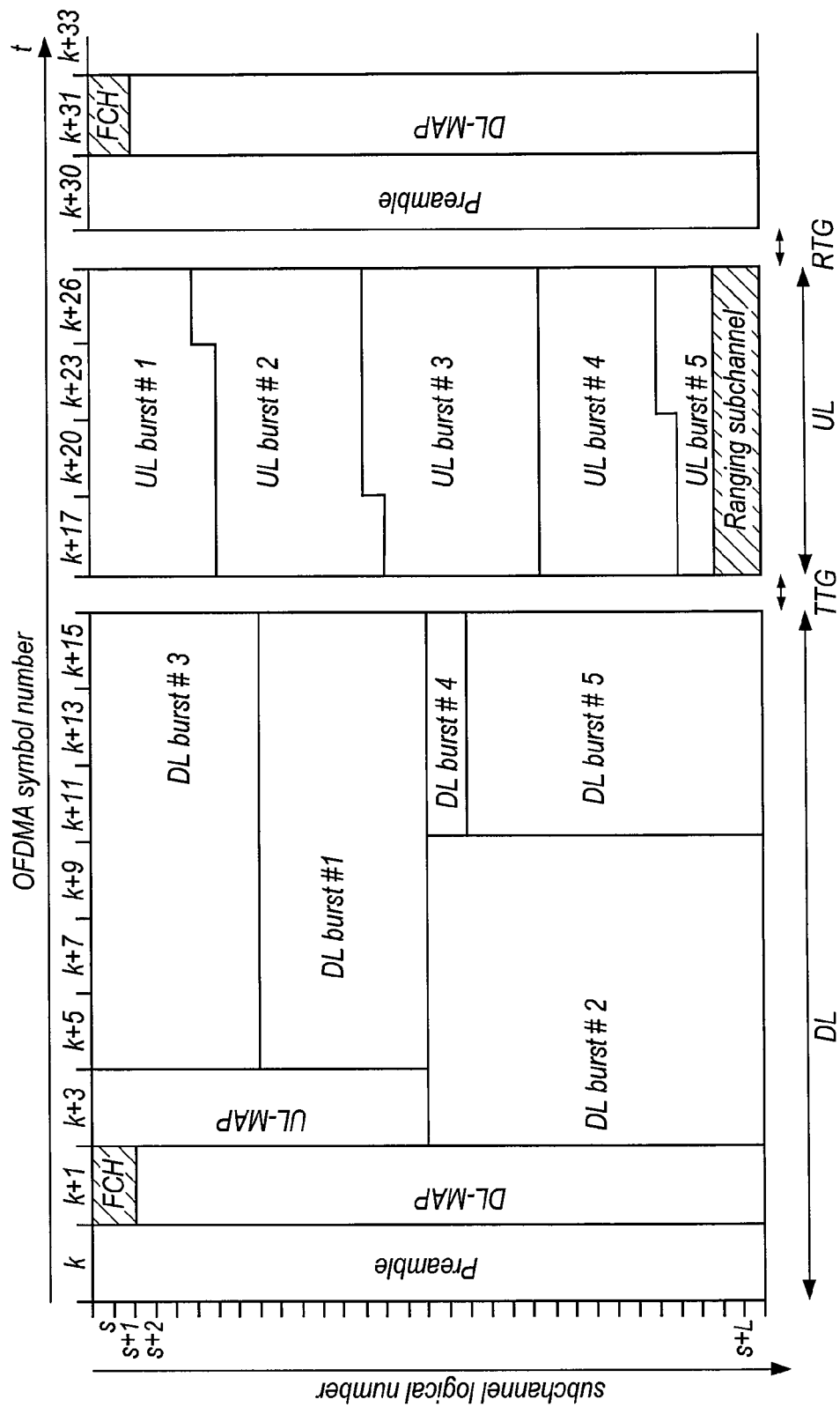
FIG. 8 shows an example TDD frame structure from OFDMA physical layer of the IEEE 802.16 standard.

As an example, FIG. 8 illustrates the single hop TDD frame structure used in the OFDMA physical layer mode of the IEEE 802.16 standard.

Both approaches (TDD & FDD) have their relative merits and are both well used techniques for single hop wired and wireless communication systems. For example the IEEE 802.16 standard incorporates both an FDD and TDD mode.

However, when a node is required to support two independent links to two different nodes, e.g. a relay station communicating with a basestation and a mobile, the existing TDD or FDD frame structures require some modification in order to make realization of the relay practical. Numerous proposals have recently been made that provide solutions to this problem. However, one underlying issue with any proposal that involves synchronous BS and RS operation (i.e. aligned frame start time) is how to control the receive to transmit transition point in the RS and also how to prevent extra Tx/Rx transitions in a frame.

Frame Structure Description

Figure 1:
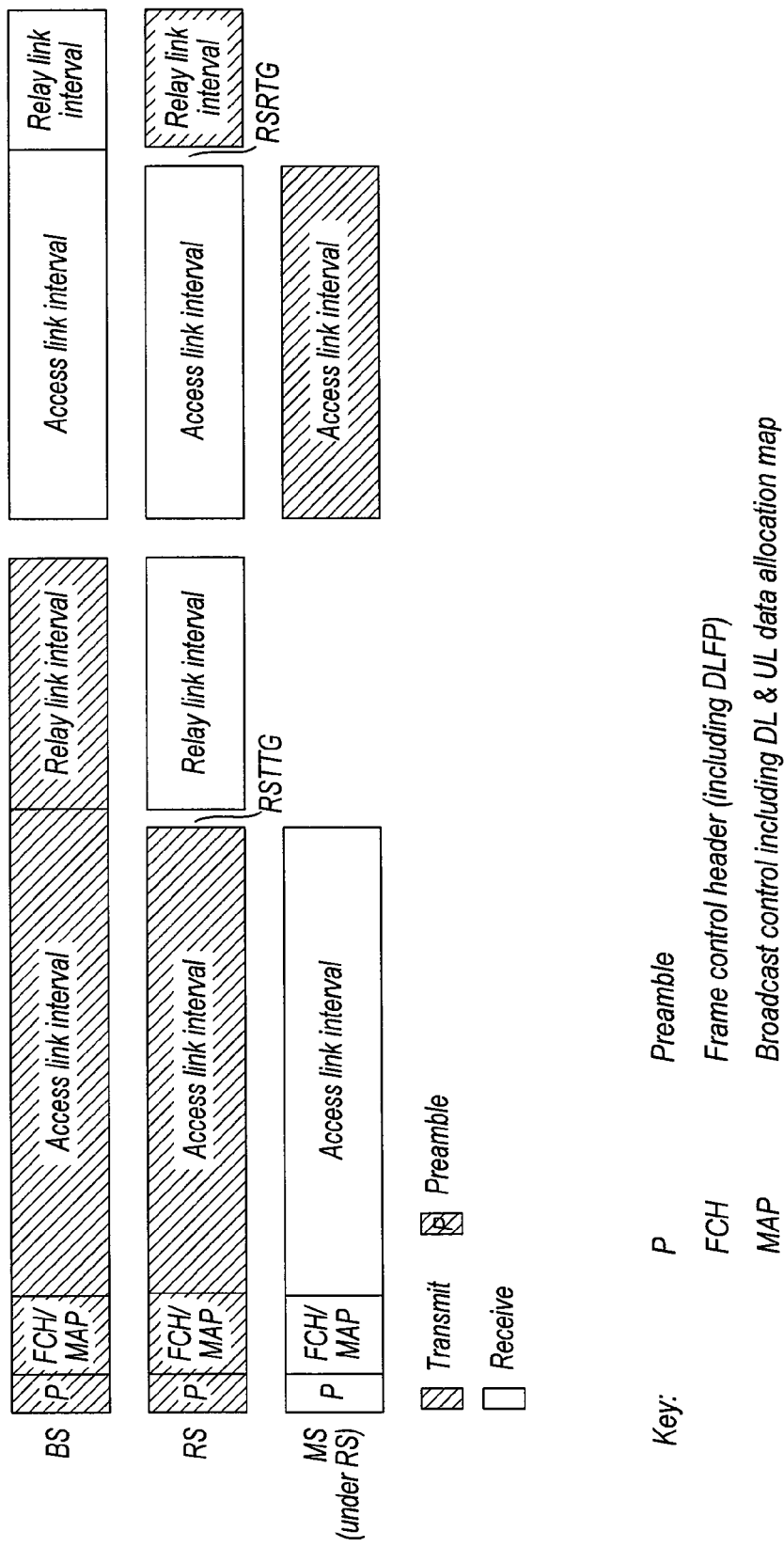
FIG. 1 shows a frame structure.

The first part of the solution according to particular embodiments is to use a modified frame structure at the BS and RS, as shown in FIG. 1. This frame structure provides an optimal and scalable solution. In the case of two hop relaying, it requires subdivision of the subframes into only two zone or transmission intervals and does not require any extra Tx/Rx transitions at a device than that used in a single hop system. The first zone in the DL is BS-MS or RS-MS communications. The second zone is used for BS-RS communications.

Whilst in-frame relaying on the DL is not supported, it could be possible to perform UL in-frame relaying. The benefits in this embodiment are due to the fact that the transition from transmit to receive is at the end of the DL subframe, i.e. putting the BS to RS communication at the end of the subframe, and doing the reverse in the uplink, the number of rx/tx transitions is not increased.

Figure 2A:
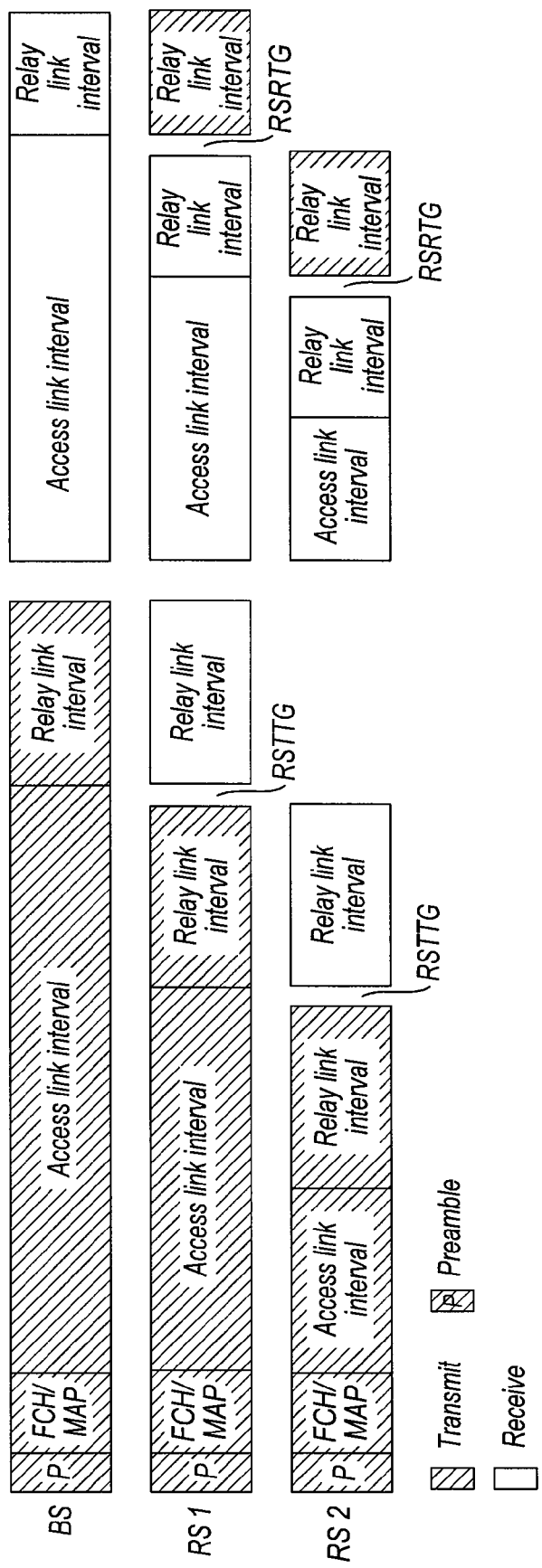
FIG. 2a shows a beyond three-hop frame structure (with internal subdivision)
Figure 2B:
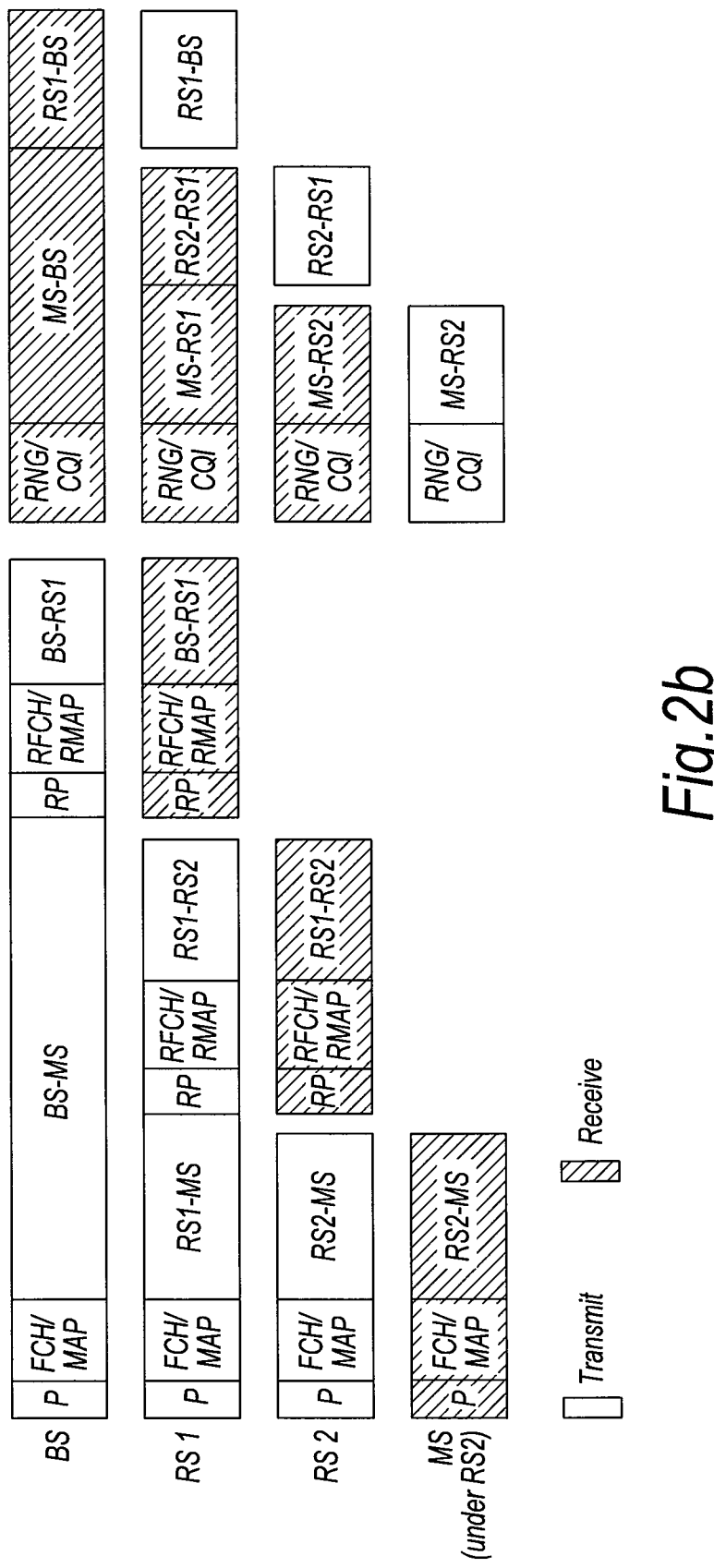
FIG. 2b shows a preferred detailed frame structure for three-hop.

The solution is scalable to three hop relaying without the need for increasing the number of transmit to/from receive transitions. However, this will require subdivision of the subframes into three transmission intervals or zones, as shown in FIG. 2a. Note that FIG. 2a shows at least four hop relaying because an extra relay link interval is provided in the downlink subframe for RS2 to an RS3. If three-hop relaying only were required, RS2 would have no relay link in the downlink subframe and its access length would be identical in length to that of RS1. FIG. 2b shows a preferred detailed frame structure for three-hop communication.

Figure 3:
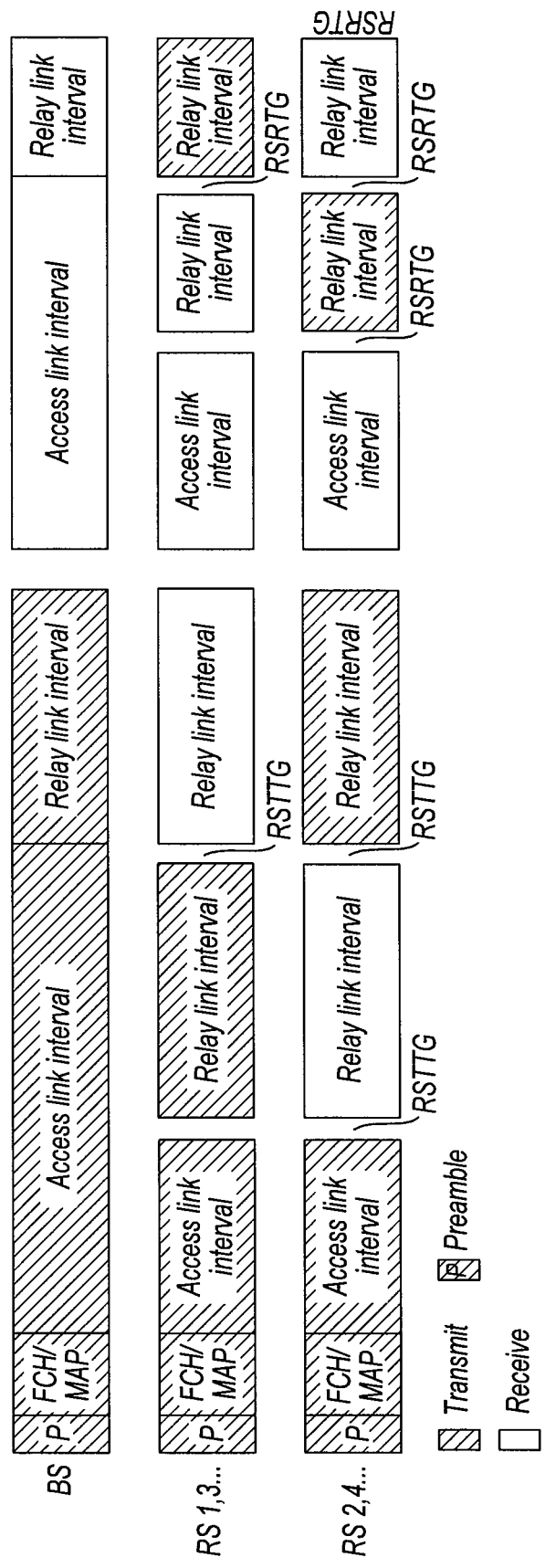
FIG. 3 shows a beyond two-hop frame structure (extra transition)

It is possible to use this structure to support beyond three hop relaying, and there are two approaches to facilitating this. The first would be to allow an extra Tx/Rx transition in the DL subframe and place another relay link interval after the reception operation at RS2. The alternative is to utilise some of the RS2-MS transmission interval to provide the relay link interval, effectively increasing the number of zones or intervals in the subframe (see FIG. 2a). The advantage of this latter over the former being that the number of Rx/Tx transitions is not increased, the disadvantage is that radio resource at RS2 is reduced for the RS2-MS communications. The former solution is illustrated in FIG. 3.

Figures 4, 5A:
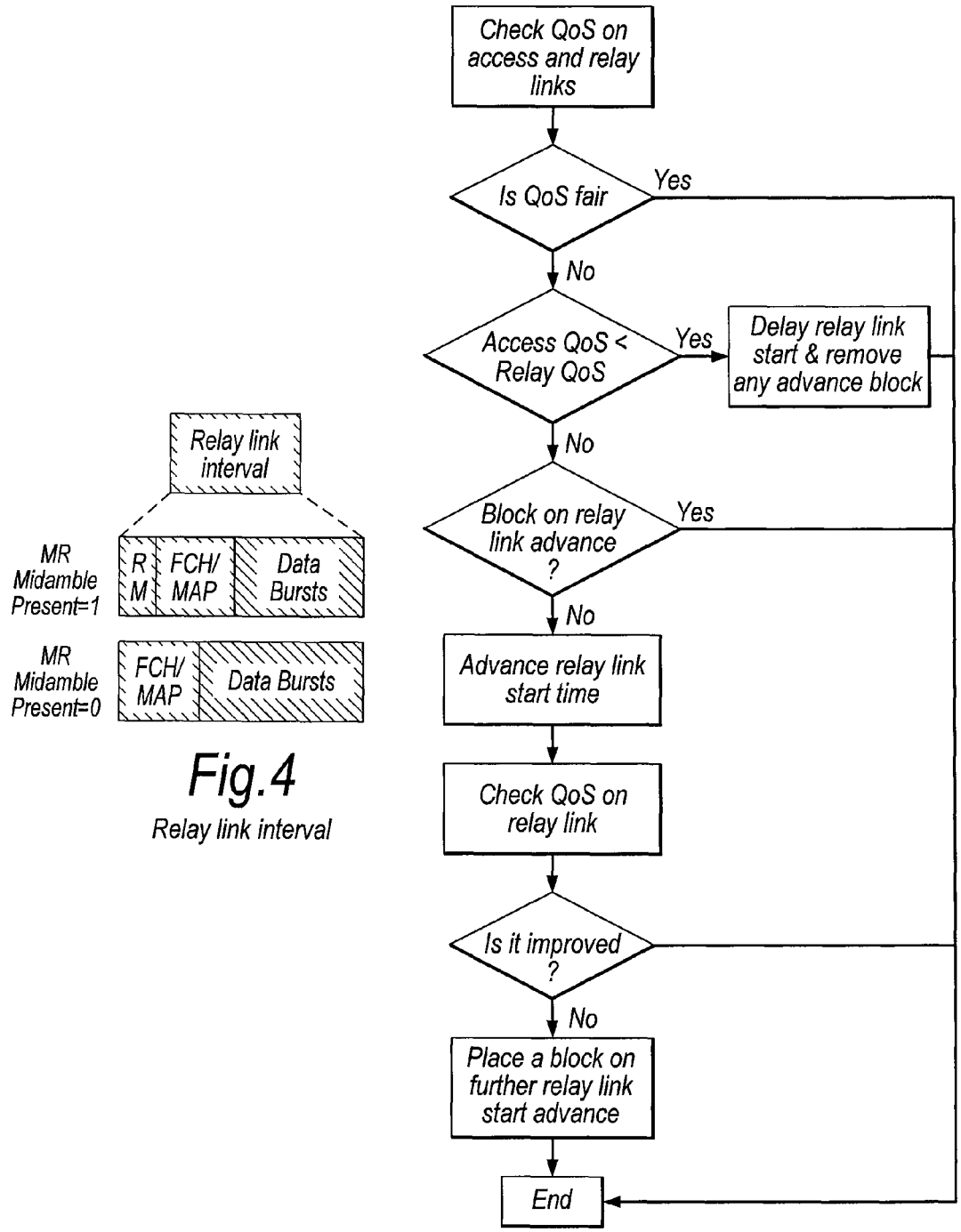
FIG. 4 shows a relay link interval.
FIG. 5a shows an RP position determination algorithm.

Note that the MS ranging, fast-feedback channel and ACK channel transmission can occur anywhere within the interval, however it is beneficial to place this at the front of the interval in order to provide this information to the receiver as early as possible. Preferred details of the transmission within the relay link interval are shown in FIG. 4.

The main benefit of this proposal for the relay link interval is that it can essentially be the same as the access link interval in terms of structure. It is possible to make the supported signaling, the same, plus some enhanced messages to support the RS functionality, or alternatively only support a subset of all messages across this link plus the enhancements. This enables the RS modem to be very similar in design to the MS modem reducing development cost and time due to being able to reuse much of the modem required for an MS. The details of a RM (relay midamble) are included in particular co-pending applications referenced and incorporated by reference above.

Relay Station Operation

In the first instance when the RS connects to the BS it uses the preamble (P) to locate the frame start and synchronize to the BS. The BS then signals to the RS through a broadcast message (FCH/MAP) where the RM is located or will be located if this is the first RS connecting to the BS in the frame, if RM transmission is to be supported. If RM is not used by the BS then instead it signals where the FCH/MAP message will be located in the relay link interval. The RS can then stop receiving the preamble and FCH/MAP in access link interval and start transmitting its own preamble (P) and FCH/MAP to be received by the MS or other RS wishing to connect to the network through this RS. This transition from use of the relay to access link involves in the frame before transition is complete receiving the information on both links, the FCH/MAP information in the access link telling the relay where the FCH/MAP information is in the relay link. Then FCH/MAP information in the relay link then tells the RS where it will find the relay link in the following DL and UL subframe. The BS (or RS) then optionally broadcasts the RM symbol that can be used for the connected RS to maintain synchronization, following this it will send control information, similar to the FCH & MAP message in the relay link interval, to the RS followed by data. Part of this FCH/MAP message in the relay link, which is broadcast to all RSs, will indicate where the relay link interval will be located in the subsequent frame. Therefore, an RS can track where the relay link interval will move to. Once the RS begins broadcast of the preamble in the access link interval is in now fully operational and ready to support connection of devices to it (ie. MS or further RS).

In order to make this relay link interval start information robust in nature when broadcast in either the FCH/MAP in the access or relay link interval, it is an absolute value that indicates the number of symbols after the preamble transmission (P) that the relay link interval starts. This then allows the RS to know when to transition from receive to transmit.

Should an RS not be able to receive the relay link FCH/MAP in one frame then it can recover operation in the subsequent frame by scanning for the RM, or by receiving the information in the FCH/MAP message on the access link to find the current start point of the relay specific part of the frame and not transmitting a MAP message or data. As the RS will have no new data, due to loss of the RFCH/RMAP, the fact it does not transmit any data in the next frame should not compound the impact of the loss of RMAP any further.

Method for Determining Location of Relay Link in the DL/UL Subframe

The ability to change the transition point at an RS can be exploited by the radio resource management entity. By monitoring the overall QoS provided across the various links, it can determine how to partition the resource between the various transmitting entities (i.e. BS and RSs) and by adjusting the start point of the relay link interval, control the amount of the frame available to the BS for RS/MS and the RS for RS/MS communication.

For example, consider the simple case of a BS, an RS and a number of MSs connected directly and through the RS to the BS. If it is found that the QoS for the directly connected MSs is lower than that of the relayed MSs, then more transmission resource can be allocated to the BS-MS transmission by moving the relay link interval start point to later in the frame, enabling more resource for BS MAP and BS-MS data transmission. However, if the QoS on the BS-RS link is suffering, then the relay link start point can be moved earlier in the frame.

Figure 5B:
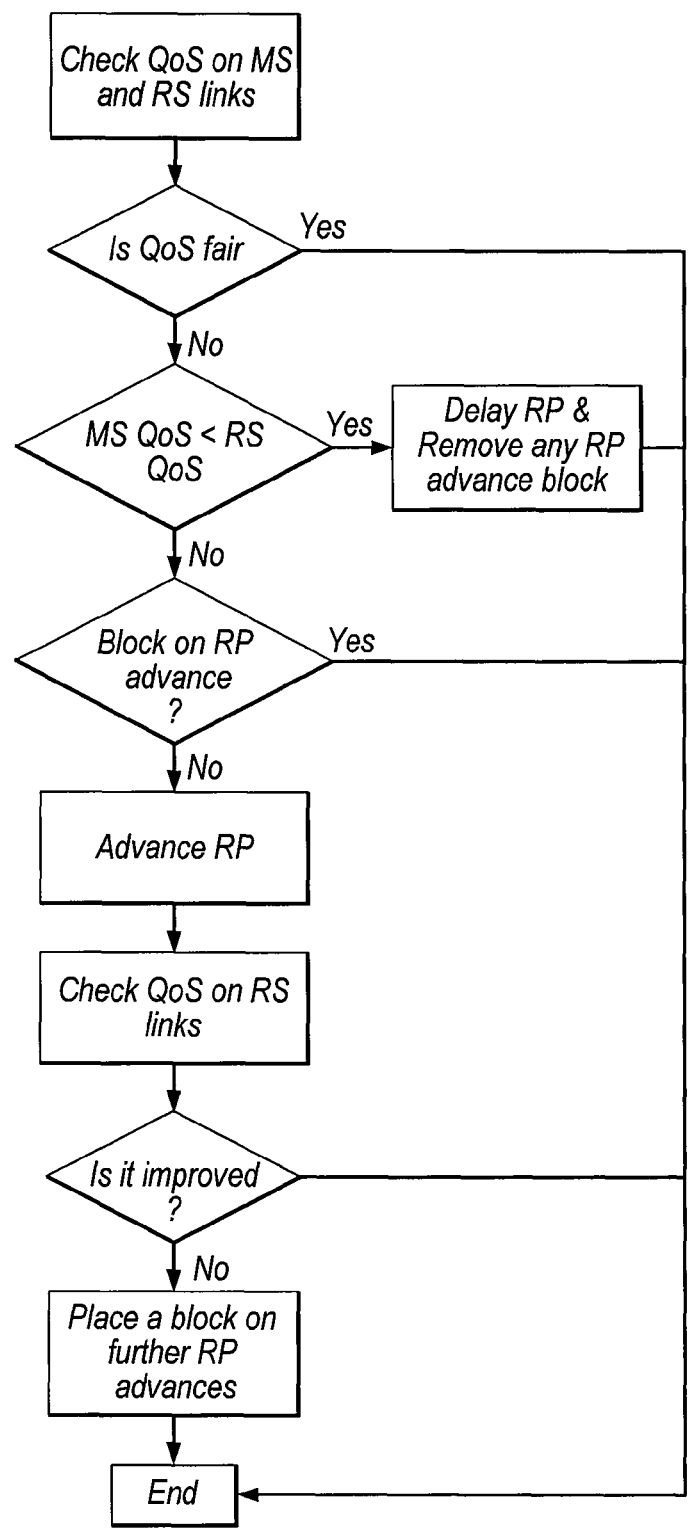
FIG. 5b shows an RP position determination algorithm.
Figure 6:
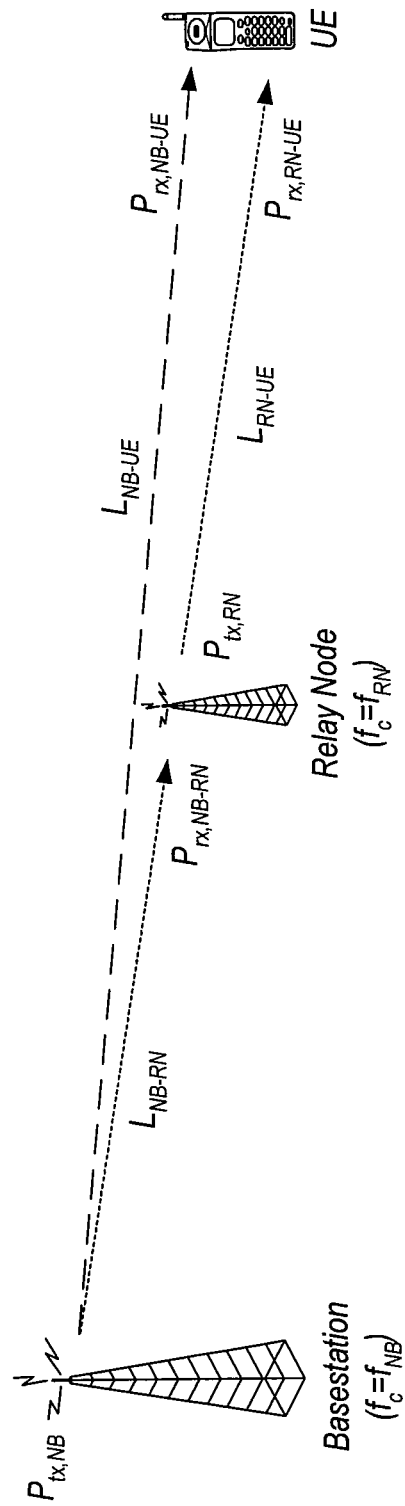
FIG. 6 shows a simple two-hop wireless communication system.
Figure 7A:
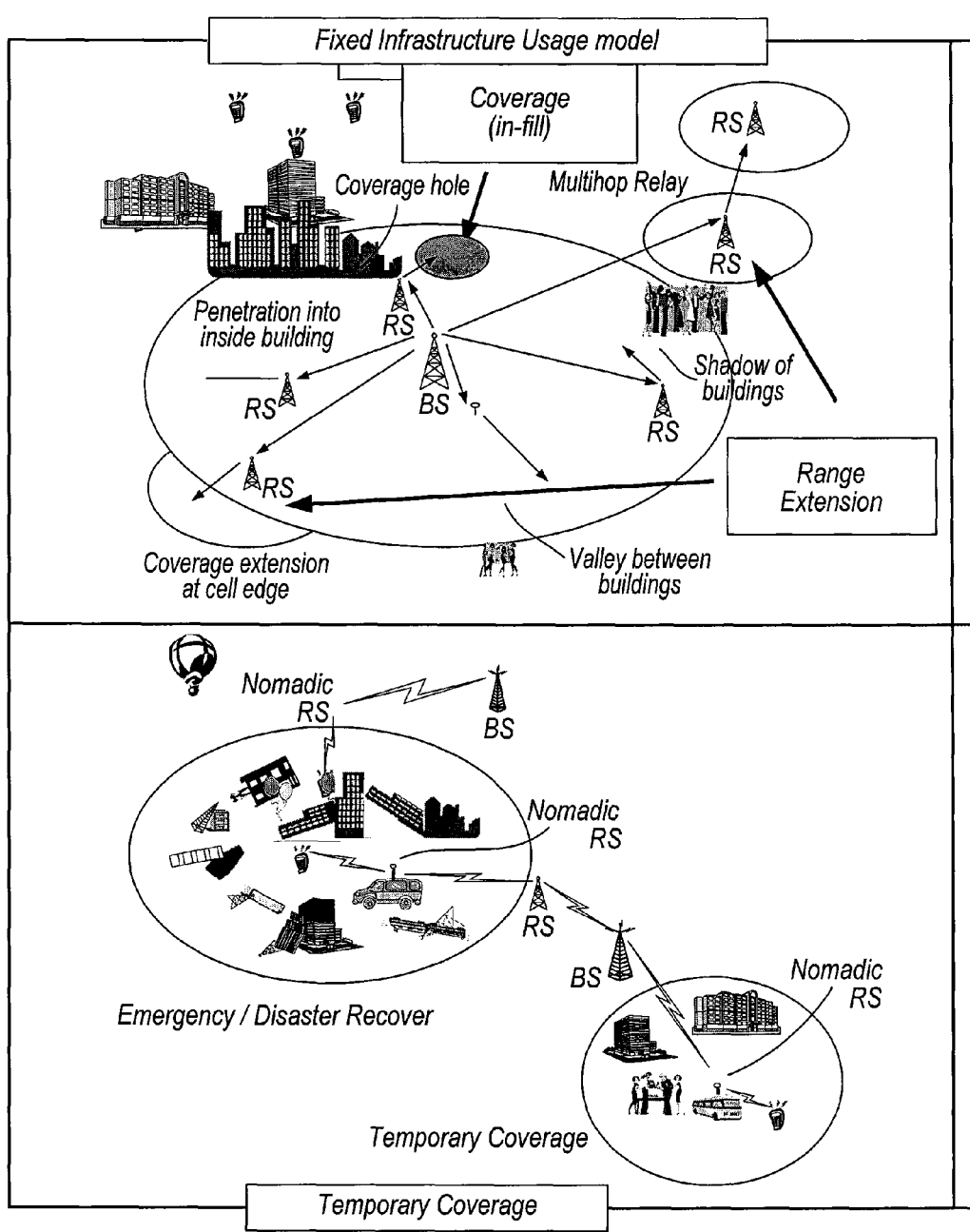
FIG. 7 shows applications for relay stations.
Figure 7B:
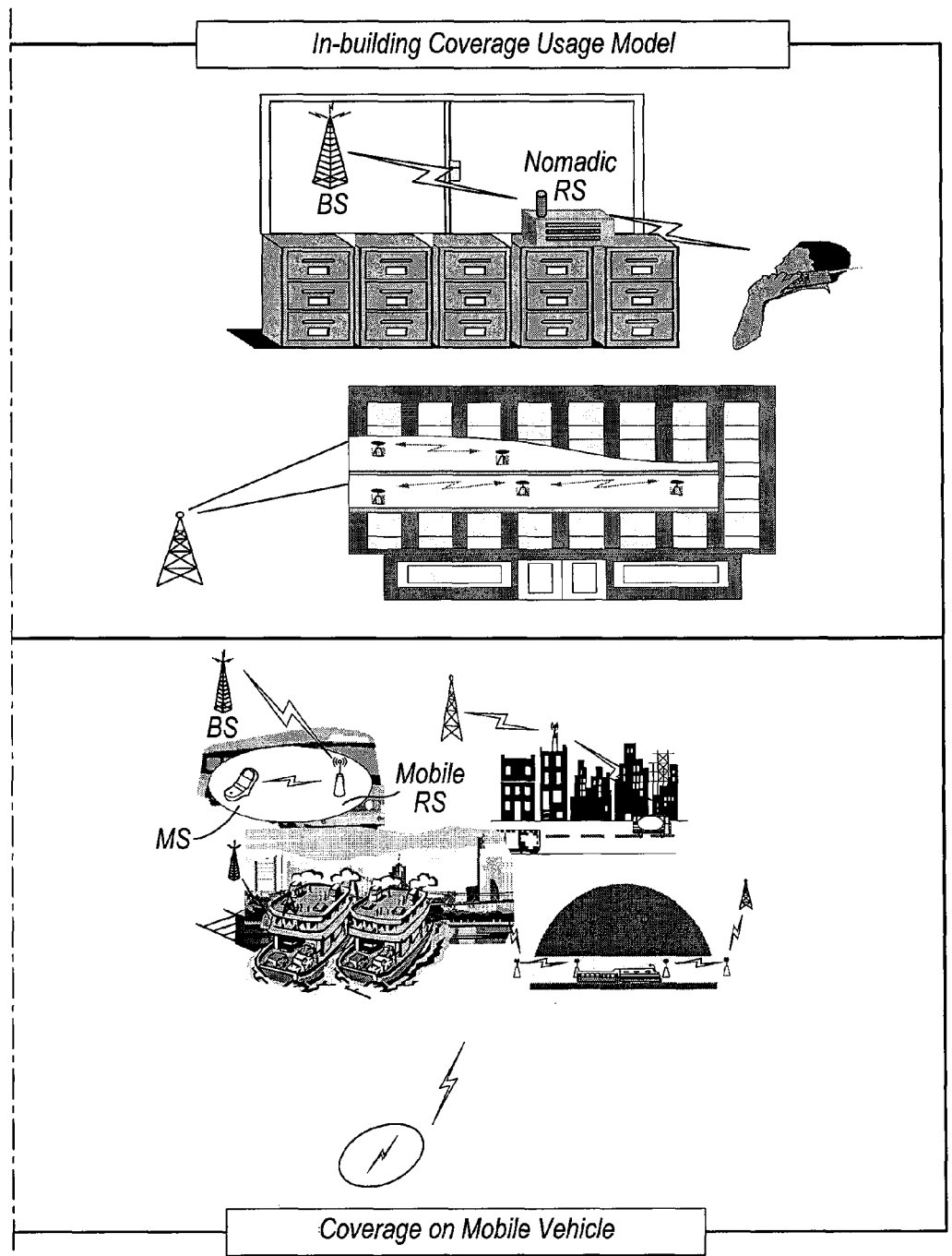

However, advancing the relay link transmission interval must always be offset against potentially limiting the QoS on the RS-MS link. This is because as the capacity increases on the BS-RS link, then so can the capacity on the RS-MS link, however there will come a point when further increase in capacity on the BS-RS link will start to reduce capacity on the RS-MS link due to the increasing size of the BS-RS interval causing a shrinking in the RS-MS interval. Therefore, a simple algorithm to apply is that, if in advancing start point of the relay link, it is found no benefit is given to the connections served across the RS link then no further advancements of the relay link should be made as it is likely that the RS-MS link is becoming limited in capacity due to the increase in size. FIG. 5a outlines the proposed algorithm and FIG. 5b shows the proposed algorithm in a preferred embodiment including a relay preamble.

The other check is the difference between the end of the RS-MS and start of the BS-RS region, once they are adjacent then it is not worth advancing the relay link further. This would require the reporting of the size of the BS-RS and RS-MS region to the resource management entity and using this to derive the block status.

A further alternative approach to the block approach would be for the RS to report to the BS (or other RS) the status of its DL usage (this could take many forms, one example could be maximum possible RP advance by measuring the difference between the end of the frame and the current RP position). The BS or RS could then use this information to determine the maximum advancement possible in relay link start position in the case an advancement is required.

A similar approach can be used on the UL to determine how to select the relative size for the MS-BS and RS-BS intervals.

In summary, the benefits of particular embodiments may include:
  Providing an optimal solution for providing a two-hop BS/RS synchronized frame structure requiring no extra Rx/Tx transitions beyond that required for a single hop device and division of a subframe into only two transmission intervals or zones.
  Solution is extendable to three hop relaying with no further Tx/Rx transitions and division of the frame into three transmission intervals.
  Solution is extendable beyond three hops by introducing one more Rx/Tx transition per subframe, or by further division into increasing number of transmission intervals, depending on which solution fits best with the operational requirements.
  Providing a robust signaling mechanism for allowing variation in the relay midamble positioning in the frame
  Providing a mechanism for determining the optimum position for the relay midamble and overall dimensioning of the transmission intervals, with a number of variants for controlling the issue of relay link start point advancement and potential reduction, rather than improvement in performance.

Embodiments of the present invention may be implemented in hardware, or as software modules running on one or more processors, or on a combination thereof. That is, those skilled in the art will appreciate that a microprocessor or digital signal processor (DSP) may be used in practice to implement some or all of the functionality of a transmitter embodying the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

APPENDIX

Possible Application of the Frame Structure to IEEE 802.16: Frame Structure Contribution This appendix contains a proposal for a modified frame structure that enables communications to occur between an MR-BS, RS and SS. It requires no changes to the existing SS as defined in the IEEE Std. 802.16 and minimal changes to the existing BS. The frame structure is optimized for two-hop relaying and is extendible to support multihop relaying. The contribution also defines two new MAP IEs to support operation and a new SBC related TLV.

Introduction

In order to facilitate the introduction of non-transparent relays (i.e. RS that broadcasts its own preamble and other control messages) operating in the TDD mode of the OFDMA-PHY, modification to the current text in the standard is required to: define frame structure that supports multihop relaying; rules of operation in terms of RS transmission and reception intervals; and also the rules that the RS and MR-BS must follow in order to allow for turn-around in the RS and SS transceivers.

This appendix introduces a frame structure that is an extension to the existing TDD mode of the OFDMA-PHY. It enables BS and RS frame synchronous operation and also supports preamble, FCH and MAP transmission from an RS.

Whilst the frame structures introduced do require changes to the existing BS specification, they do not require any changes to the MS/SS as described in IEEE Std. 802.16. Also the frame structure is designed to provide an optimal solution for two-hop relaying that minimizes the number of changes required at the BS. It also enables the RS to reuse many of the standards features developed for the BS and SS, only requiring two new MAP IE's and one TLV to support the modified frame structure.

Proposed Frame Structure

The current TDD frame structure divides the frame into two subframes for downlink and uplink transmission. In this proposal, a simple extension to the frame structure is proposed to enable relaying that involves defining the existence of one or more relay link transmission and reception intervals in the MR-BS DL and UL subframes, respectively, to facilitate BS-RS communication. For beyond two-hop relaying, it is also possible to define a further relay link transmission and reception interval using two different approaches to facilitate RS-RS relaying.

The proposed frame structure for two-hop relaying is illustrated in FIG. 1. The access link interval at the BS and RS require no changes to the frame structure in IEEE Std. 802.16 to define them. The new relay link (R-Link) interval does require new text to define its structure and also methods for allocating a R-Link interval.

FIG. 2 illustrates the composition of the R-Link interval. The first symbol is optionally used for a relay midamble transmission (see [1] for further details) that can be used by the RS when operational as it cannot receive the preamble at the frame start. The first mandatory part of the R-Link interval is the FCH and MAP transmission, followed by optional data burst transmission. The structure of the FCH and MAP messages are unchanged from those defined in IEEE Std. 802.16 as used on the access link interval. The only change is that the MAP IEs supported on this link could be a combination of a subset of those supported on the access link and some new messages required for optimizing communications on the R-Link. The set of MAP IE messages supported on the R-Link are FFS, and at the moment this proposal provides no restriction assuming that full support of existing IEs is provided. Such discussion is out of scope of this contribution that focuses solely on frame structure definition.

The only changes required to IEs defined in IEEE Std. 802.16 are an extra IE for use in the DL-MAP and UL-MAP to indicate where the relay link interval starts at a particular transmitter. These IEs can also be used in the DL-MAP and UL-MAP in the relay interval to indicate the location of the relay link interval in the next frame thus allowing the higher layers to control the relative amount of resource allocated to the access and relay links. The proposed IEs are shown in detail in the text proposal, in short they allow the transmitter to define the end of the R-Link interval and also enable indication of the DIUC used to convey the FCH and MAP messages.

If the RS does not successfully receive the MAP information in the relay link interval in any one frame, it can refer back to the MAP in the access link to find the location again, resulting in minimal impact on performance in future frames.

The two alternative methods for supporting beyond two hop relaying are shown in FIGS. 2a and 3. Both extensions involve further subdivision of the access link interval at the RS to enable RS to RS communication. In the first technique, the access link is further subdivided for each additional hop. The second technique involves just one subdivision of the access link interval with multi-hopping being supported by alternating the usage of the two R-link intervals within the DL & UL subframes between transmission and reception.

As a result, in this proposed method the BS and the SS still obey the same frame structure as defined in IEEE 802.16-2004. Within the DL subframe, the RS may operate in both transmit and receive modes at different intervals to receive communications directed in a forward direction from a BS or RS and transmit signals to other RS or SS in a forward direction. Likewise, in the UL subframe, the RS may operate in both transmit and receive modes at different intervals to receive communications directed in a reverse direction from a SS or RS and transmit signals to other RS or BS in a reverse direction. However, the RS will never be required to perform simultaneous transmission and reception. Every time the RS transitions between transmit and receive a transition gap must be allowed for.

Finally, the process of RS network entry when utilizing this frame structure is described in [2].

The proposed frame structure ensures that the frame start times at the BS and RSs are synchronized. By operating in a time synchronized mode (i.e. transmitting 0b01 or 0b10 in the PHY Profile ID in the MOB_NBR-ADV message) it ensures that in the single frequency network case the boosted preamble transmissions do not cause interference with data transmissions, and in the case of time/frequency synchronization enables support of macro-diversity based communications such as Multi-BS-MBS and optimized handover. Through the allocation of different segments to the RSs during network entry [2] it is possible to minimize the interference between broadcast messages when using a segmented PUSC zone at the start of the frames. Thus for the SS point-of-view the composite network formed by BS and RSs looks just like a standard IEEE Std. 802.16 network.

This frame structure enables relaying with only a single frame latency on the DL and minimizes the number of transmit/receive transitions at the RS, requiring no extra transitions for two-hop relaying due to the ordering in time of the access link and relay link intervals. Whilst it could be possible to devise frame structures that theoretically enable in-frame relaying on the DL, it is considered that the processing time requirements would impose significant burden on the RS transceiver. This is because within the period of less than the DL subframe the RS would have to process the control and data transmission on the access link and construct the control and data transmission for the relay downlink. Based on the typical TDD realizations this would provide processing time of the much less than 1 ms for the RS to perform such operations.

However, the proposed frame structure would enable the RS to perform fast relaying on the UL (i.e. within the same subframe) and this may be feasible to implement for the control related messages such as those on the ACK and Fast-feedback channels where special modulation techniques are used to facilitate fast processing at the receiver.

For three or more hop relaying two variants exist, as described. The first is beneficial in that it does not require further transceiver transitions, however it requires subdivision of the DL and UL subframes, such that the available resource for the access link decreases with increasing hop number. Therefore, this solution is not suitable for large number of hops. The second is beneficial in that only requires one extra relay link interval in the DL and UL subframe, however it does require further transceiver transitions, and hence transition gaps.

Finally, a further benefit is that the RS is the same as the BS from the point of transmission on the access link. Further, the RS is very similar to the SS on the relay link, from the point-of-view of the BS. Therefore, all of the existing messages and information elements defined for the access link can be reused on the relay link.

Conclusion

This proposal provides a simple extension to the existing frame structure defined in IEEE Std. 802.16 that enables support for non-transparent relaying. It provides an optimal solution for the two-hop case and is extendible to support multihop relaying. In order to support this frame structure only two new MAP IEs are required along with one TLV. This enables reuse of much of the features already defined for the BS and SS for the purposes of defining the operation of the RS.

Proposed Changes to the IEEE 802.16 Standard
Insert the Following Text at the End of the Subclause 6.3.7.2.
If the BS supports multihop relay then the DL and UL subframes shall be subdivided into a number of transmission intervals to define the time in the subframe that the MR-BS and RS can expect to be either operating in transmit or receive mode. The ordering of the different intervals is defined in the OFDMA PHY specific section and the duration of each of these intervals within the subframe is controlled in the higher layers within the system.
Change Subclause 6.3.7.3 as Indicated:
6.3.7.3 DL-MAP The DL-MAP message defines the usage of the dowlink intervals on the access and relay links for a burst mode PHY.
Change Subclause 6.3.7.4 as Indicated:
6.3.7.4 UL-MAP The UL-MAP message defines the uplink usage on the access and relay links in terms of the offset of the burst relative to the Allocation Start Time (units PHY-specific).
Insert a New Subclause 8.4.4.2.1.
8.4.4.2.1 TDD Frame Structure Extension for MR When implementing a TDD system that supports multihop relaying, the frame structure is built from RS transmissions as well as MR-BS and SS transmissions. In the DL transmission period the BS and RS may transmit and in the UL transmission period the SS and RS may transmit.

The OFDMA frame may include one or more R-Link transmission and reception intervals and the RS may perform both transmission and reception in one subframe. In general the access link interval shall precede the R-Link interval(s). For two-hop relaying the DL subframe consists of a DL access link interval followed by one R-DL interval. The UL subframe consists of an access link interval followed by one R-UL interval. The details of the R-Link interval are provided later in this section. FIG. 1 illustrates the frame structure for the two-hop case.

For the case of more than two hop relaying one extra R-Link interval may be utilized in the DL and UL subframes at an RS, prior to the R-Link intervals illustrated in FIG. 1. Two different options are available for facilitating more than two hop relaying. The first is illustrated in FIG. 2a and involves using part of the access link to provide an R-Link when an RS connects to the BS or RS that is not already communicating with another RS.

The second frame structure option for more than two-hop relaying is illustrated in FIG. 3. It involves two R-Link intervals in both the DL and UL subframes that alternate between transmission and reception with increasing number of hops from the BS.

The frame start time at the BS and RSs shall be synchronized within the timing tolerance of ⅛ of the CP.

Allowances shall be made by an RSTTG and RSRTG in between transmit and receive periods to allow the RS to turn around. The capabilities RSTTG and RSRTG will be provided by the RS during RS network entry (see 11.8.3.7.20).

When the RS transmission and reception operation is not controlled by the RS, information shall not be transmitted to an RS later than (RSRTG+RTD) before an RS transmit allocation, and information shall not be transmitted to it earlier than (RSTTG−RTD) after the end of the an RS transmit allocation, where RTD denotes the round-trip-delay between the transmitter and the RS.

The RS shall make allowances for the subscriber station by an SSRTG and SSTTG. The capabilities SSRTG and SSTTG will be acquired by the RS during SS network entry.

The RS shall not transmit to an SS later than (SSRTG+RTD) before its scheduled uplink allocation, and shall not transmit downlink information to it earlier than (SSTTG−RTD) after the end of its scheduled uplink allocation, where RTD denotes the RS to SS round trip delay.

The RS shall transmit a preamble signal, FCH and MAP at the start of the DL subframe on the access link. In order to facilitate the reception of control related information from the MR-BS, the MR-BS shall make use of the R-Link transmission interval that is arranged to occur after the RS has completed transmission of the access link to optionally transmit a MR midamble followed by a mandatory FCH. The FCH contains the DL Frame Prefix described in Section 8.4.4.3, and specifies the length of the DL-MAP message that immediately follows the DL Frame Prefix and the coding used for the DL-MAP message. The FCH and MAP messages in the R-Link interval shall transmitted in a PUSC zone using the DIUC indicated in the DL-MAP IE that defined the R-Link interval. The structure of the R-DL interval is illustrated in FIG. 4.

The existence of a MR midamble and the start position of the R-DL transmission interval shall be signaled in the MR_DL_Allocation_IE. This message shall also indicate the DIUC to be used for the FCH and MAP messages and indicates the duration of the R-DL interval. Once an R-DL transmission interval is defined, the start position and duration can be changed at any time by altering the values in the MR_DL_Allocation_IE. A similar MR_UL_Allocation_IE shall be used in the UL-MAP to define the R-UL reception interval. The MR_DL_Allocation_IE and MR_UL_Allocation_IE may also be used in the DL-MAP and UL-MAP messages respectively on the R-DL to indicated the location of the R-Link intervals in the DL and UL subframes in the next frame.

An RS shall be capable of receiving control information on the R-Link that may impose restrictions on the resource usage on the access link to prevent the RS performing resource allocation at certain intervals in time.
Change the Items in Table 277a in Section 8.4.5.3.2.1 as Indicated:
09 MR_DL_Allocation_IE
0A Reserved
Insert New Subclause 8.4.5.3.28:
8.4.5.3.28 MR_DL_Allocation_IE In the DL-MAP on the access link, an MR-BS or RS may transmit DIUC=15 with the MR_DL_Allocation_IE( ) to indicate the location of the R-DL interval in the DL subframe as well as whether an MR midamble is present at the start of this interval. The usage of the of the interval is described by the FCH and DL-MAP located following the MR midamble in the R-DL transmission interval. In the DL-MAP on the R-Link, an MR-BS or RS may transmit DIUC=15 with the MR_DL_Allocation_IE( ) to indicate the location of the R-DL transmission interval in the next frame.

TABLE 286aa

MR DL Allocation

| Syntax | Size | Notes |
|---|---|---|
| MR_DL_Allocation_IE( ){ | | |
|    Extended DIUC | 4 bits | MR_DL_Allocation_IE = 0x09 |
|    Length | 4 bits | |
|    MR midamble present | 1 bit | 0b0 = No midamble<br>0b1 = Midamble is first symbol in the allocation. |
|    R-DL duration present | 1 bit | 0b0 = No duration field present, R-DL extends to the end of the subframe<br>0b1 = Duration field is present, R-DL defined by this IE has a defined duration |
|    FCH and MAP DIUC | 4 bits | DIUC used to transmit the FCH and MAP messages on the R-Link. |
|    R-DL OFDMA symbol offset | 8 bits | Location of the R-DL interval relative to the frame start. |
|    if (R-DL duration present = 1) { | | |
|      R-DL duration | 8 bits | Duration of the R-DL interval in symbols. |
|    } | | |
| } | | |

Change the Items in Table 290a in Section 8.4.5.4.4.1 as Indicated:
0B MR_UL_Allocation_IE
0C . . . 0F Reserved
Insert New Subclause 8.4.5.3.28:
8.4.5.3.29 MR_UL_Allocation_IE In the UL-MAP on the access link, an MR-BS or RS may transmit UIUC=15 with the MR_UL_Allocation_IE( ) to indicate the location of the R-UL interval in the UL subframe. The usage of this interval is described by the UL-MAP that follows the DL-MAP in the R-DL interval. In the UL-MAP on the R-Link, an MR-BS or RS may transmit UIUC=15 with the MR_UL_Allocation_IE( ) to indicate the location of the R-UL receive interval in the next frame.

TABLE 286ab

MR UL Allocation

| Syntax | Size | Notes |
|---|---|---|
| MR_UL_Allocation_IE( ){ | | |
|    Extended UIUC | 4 bits | MR_UL_Allocation_IE = 0x0B |
|    Length | 4 bits | |
|    R-UL duration present | 1 bit | 0b0 = No duration field present; R-UL extends to the end of the subframe.<br>0b1 = Duration field is present; R-UL defined by this IE has a defined duration. |
|    OFDMA symbol offset | 8 bits | — |
|    if (R-UL duration present = 1) { | | |
|      R-UL duration | 8 bits | Duration of the R-UL interval in symbols. |
| } | | |

Insert New Subclause 11.8.3.7.20:
11.8.3.7.20 RS Transition Gaps

| Type | Length | Value | Scope |
|---|---|---|---|
| TBD | 1 | Bits #0-3: RSTTG (OFDMA symbols)<br>Bits #4-8: RSRTG (OFDMA symbols) | SBC-REQ<br>SBC-RSP |

REFERENCES

[1] Hart, M. et al., "Relay midamble", IEEE C802.16j-06/144, IEEE 802.16 meeting #46, Dallas, November 2006.

[2] Hart, M. et al., "Network entry procedure for non-transparent relay station", IEEE C802.16j-06/143, IEEE 802.16 meeting #46, Dallas, November 2006.

What is claimed is:

1. A transmission method for use in a multi-hop wireless communication system, the system comprising a base station apparatus, a user terminal and one or more intermediate apparatuses, said base station configured to transmit along a series of links forming a communication path extending from the base station to the user terminal via the intermediate apparatus, and the intermediate apparatus configured to receive from a previous apparatus along the communication path and to transmit to a subsequent apparatus along the communication path, the system transmitting using a downlink sub-frame in a time-division-duplex communication system, with a plurality of transmission windows within the downlink subframe, each window occupying a part of the downlink sub-frame, the transmission windows including a relay window for transmission by the base station to at least one of the intermediate apparatuses, the relay window being defined as the last window in the downlink sub-frame, the transmission method comprising:

in at least one said downlink sub-frame assigning the relay window to the base station for data transmission to at least one of said intermediate apparatuses; so that at least one window between a control window assigned to said base station or one or more of said intermediate apparatuses for control information transmission and the relay window is assigned to the at least one of said intermediate apparatuses for data transmission; and
transmitting in the downlink sub-frame.

2. The transmission method according to claim 1, wherein the downlink sub-frame further includes an intermediate window between the control window and the relay window, and the method further comprises:
in the downlink sub-frame assigning the intermediate window to the particular intermediate apparatus for data transmission.

3. The transmission method according to claim 2, wherein the source access window encompasses the intermediate window.

4. The transmission method according to claim 2, wherein the control window, source access window and relay window together occupy the whole or substantially the whole of a downlink sub-frame.

5. The transmission method according to claim 2, wherein the system comprises a single intermediate apparatus and the intermediate window is for transmission to the user terminal.

6. The transmission method according to claim 2, wherein the system comprises at least two said intermediate apparatuses and the downlink sub-frame includes two constituent intermediate windows forming the intermediate window: an intermediate link window for transmission from the particular intermediate apparatus to a subsequent intermediate apparatus along the communication path and an intermediate access window for transmission from the subsequent intermediate apparatus to the user terminal, the method further comprising:
in the downlink subframe assigning the intermediate access and intermediate link windows to the particular and subsequent intermediate apparatuses for data transmission.

7. The transmission method according to claim 6, wherein the system comprises at least three said intermediate apparatuses, the particular and subsequent intermediate apparatuses being the first and second intermediate apparatuses along the communication path, the intermediate access window encompassing a further constituent intermediate access window and a further constituent intermediate link window both for transmission by the third intermediate apparatus in the communications path; the method comprising:
employing said format to assign the constituent intermediate windows to the intermediate apparatuses for data transmission.

8. The transmission method according to claim 6, wherein the system comprises at least three said intermediate apparatuses, the particular and subsequent intermediate apparatuses being the first and second intermediate apparatuses along the communication path and the downlink sub-frame further includes an extra window after the intermediate window for the second intermediate apparatus to transmit to the third intermediate apparatus along the communication path; the method further comprising:
employing said format to assign the extra window to the second intermediate apparatus.

9. The transmission method according to claim 8, wherein the system comprises at least four intermediate apparatuses, the method further comprising assigning the intermediate link window to a first intermediate apparatus and a third intermediate apparatus and assign the extra window to a second intermediate apparatus and a fourth intermediate apparatus.

10. The transmission method according to claim 8, wherein the relay window encompasses the extra window.

11. The transmission method according to claim 2, wherein each window assigned to an intermediate apparatus comprises at least two component transmission windows, one of those component transmission windows being for transmission of intermediate apparatus control information, and one of those component transmission windows being for transmission of data.

12. The transmission method according to claim 11, wherein each window assigned to an intermediate apparatus comprises three component transmission windows, one of those component transmission windows being for transmission of a transmission introduction sequence for that intermediate apparatus.

13. The transmission method according to claim 11, wherein the component transmission window for transmission of intermediate apparatus control information indicates format information relating to the time position of the intermediate apparatus control information or the time position of the transmission introduction sequence respectively in a subsequent downlink sub-frame.

14. The transmission method according to claim 11, wherein the component transmission window for transmission of intermediate apparatus control information indicates format information relating to encoding or modulation of the intermediate apparatus control information or transmission introduction sequence in a subsequent downlink sub-frame.

15. The transmission method according to claim 1, wherein the system comprises at least a further user terminal, the downlink sub-frame defining a source access window between the control window and the relay window for transmission to such a further user terminal,
further comprising assigning the source access window to said base station to allow transmission of data directly to such a further user terminal along a corresponding single link forming a direct communication path.

16. The transmission method according to claim 15, wherein transmission time available in the downlink sub-frame is shared between the source access window and the relay window, further comprising, prior to assigning windows for transmission, monitoring the quality of service provided by the source access and relay windows and adjusting the time position of a division between the source access and relay window interval parts accordingly.

17. The transmission method according to claim 16, further comprising, after adjusting the time position of the division, checking whether the adjustment has improved quality of service in the window having the enlarged part and blocking further adjustment in that direction if there has been no such improvement.

18. The transmission method according to claim 17, further comprising unblocking the further adjustment if the division is subsequently moved in the other direction. apparatus control information or transmission introduction sequence in a subsequent downlink sub-frame.

19. The transmission method according to claim 1, wherein the system comprises at least a further user terminal and the intermediate access window is also for transmission from the particular intermediate apparatus to a further user terminal.

20. The transmission method according to claim 1, wherein the control window comprises at least two component windows, one of those component windows being for transmission of a preamble and another of those component windows being for transmission of other control information including format information.

21. The transmission method according to claim 20, wherein each window assigned to an intermediate apparatus comprises at least two component transmission windows, one of those component transmission windows being for transmission of intermediate apparatus control information, and one of those component transmission windows being for transmission of data and wherein the format information relates to the time position of the intermediate apparatus control information or the time position of transmission introduction sequence respectively in the downlink sub-frame.

22. The transmission method according to claim 20, wherein each window assigned to an intermediate apparatus comprises at least two component transmission windows, one of those component transmission windows being for transmission of intermediate apparatus control information, and one of those component transmission windows being for transmission of data and wherein the format information relates to encoding or modulation of the intermediate apparatus control information or transmission introduction sequence in the downlink sub-frame.

23. The transmission method according to claim 1, wherein the frequency bandwidth profiles of at least two of said transmission windows encompass a common part of the available transmission frequency bandwidth.

24. The transmission method according to claim 1, wherein the frequency bandwidth profiles of at least two said transmission windows extend over substantially the entire transmission frequency bandwidth for the respective interval parts.

25. The transmission method according to claim 1, comprising employing a space division multiple access technique in one or more of said transmission windows of said downlink sub-frames, as the case may be.

26. The transmission method according to claim 1, wherein said system is an OFDM or OFDMA system, and wherein the downlink sub-frame is a format for an OFDM or OFDMA downlink sub-frame of an OFDM or OFDMA time-division-duplex frame.

27. The transmission method according to claim 1, wherein each said transmission window comprises a region in an OFDM or OFDMA frame structure.

28. The transmission method according to claim 1, wherein each said transmission window comprises a zone in an OFDM or OFDMA frame structure.

29. The transmission method according to claim 1, wherein the intermediate apparatus is a relay station.

30. A multi-hop wireless communication system, the system comprising:
a base station, a user terminal and one or more intermediate apparatuses, said base station configured to transmit along a series of links forming a communication path extending from the base station to the user terminal via the intermediate apparatus, and the intermediate apparatus configured to receive from a previous apparatus along the communication path and to transmit to a subsequent apparatus along the communication path;
the system transmitting using a downlink sub-frame in a time-division-duplex communication system with a plurality of transmission windows within the downlink sub-frame, each window occupying a part of the downlink sub-frame, the transmission windows including a relay window for transmission by the base station to at least one of the intermediate apparatuses, the relay window being defined as the last window in the discrete downlink sub-frame;
an assignor configured in at least one said downlink sub-frame to assign the relay window to the base station for data transmission to at least one of said intermediate apparatuses; so that at least one window between a control window assigned to said base station or one or more of said intermediate apparatuses for control information transmission and the relay window is assigned to the at least one of said intermediate apparatuses for data transmission; and
transmitting in the downlink sub-frame.

31. Software embodied on a non-transitory computer-readable medium and configured, when executed on one or more computing devices of a multi-hop wireless communication system, to cause the system to carry out a transmission method, the system comprising a base station, a user terminal and one or more intermediate apparatuses, said base station configured to transmit along a series of links forming a communication path extending from the base station to the user terminal via the intermediate apparatus, and the intermediate apparatus configured to receive from a previous apparatus along the communication path and to transmit to a subsequent apparatus along the communication path, the system transmitting using a downlink sub-frame in a time-division-duplex communication system, with a plurality of transmission windows within the downlink sub-frame, each window occupying a part of the downlink sub-frame, the transmission windows including a relay window for transmission by the base station to at least one of the intermediate apparatuses, the relay window being defined as the last window in the downlink sub-frame, the transmission method comprising:
in at least one said downlink sub-frame assigning the relay window to the base station for data transmission to at least one of said intermediate apparatuses; so that at least one window between a control window assigned to said base station or one or more of said intermediate apparatuses for control information transmission and the relay window is assigned to the at least one of said intermediate apparatuses for data transmission; and
transmitting in the downlink sub-frame.

\* \* \* \* \*

UNITED STATES PATENT AND TRADEMARK OFFICE
CERTIFICATE OF CORRECTION

| | | |
|---|---|---|
| PATENT NO. | : 8,634,343 B2 | Page 1 of 1 |
| APPLICATION NO. | : 11/856178 | |
| DATED | : January 21, 2014 | |
| INVENTOR(S) | : Michael John Beems Hart et al. | |

It is certified that error appears in the above-identified patent and that said Letters Patent is hereby corrected as shown below:

On the Title Page, Item (54) and in the Specification, Column 1, Line 3, Delete "INK" and insert --LINK--.

In the Claims,

Column 16, Lines 52-54: After "other direction." delete "apparatus control information or transmission introduction sequence in a subsequent downlink sub-frame.".

Signed and Sealed this
Eleventh Day of November, 2014

Michelle K. Lee
*Deputy Director of the United States Patent and Trademark Office*